May 24, 1932.  D. W. SESSIONS  1,859,994
LIFTING JACK
Filed Aug. 4, 1930
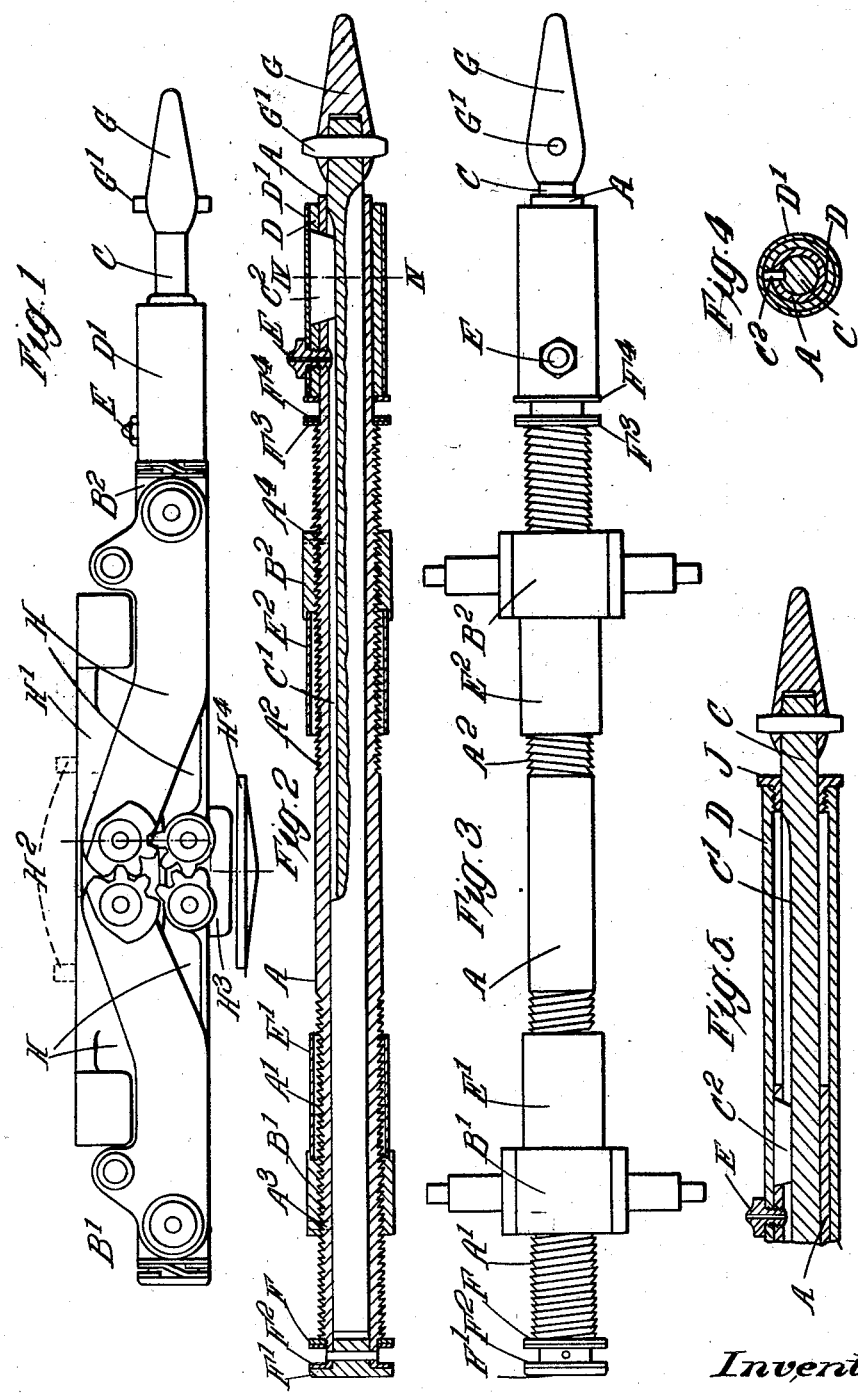
Inventor:
Donald Wilfred Sessions, Patented May 24, 1932

1,859,994

UNITED STATES PATENT OFFICE

DONALD WILFRED SESSIONS, OF FINCHLEY, LONDON, ENGLAND

LIFTING JACK

Application filed August 4, 1930, Serial No. 472,913, and in Great Britain June 4, 1930.

This invention relates to lifting jacks of the toggles or lazy-tongs kind having a screw-threaded spindle rotation of which causes extension or collapse of the jack.

According to the invention the spindle is made hollow and may be adapted to receive a slidable rod keyed to the spindle so that the rod may normally be located within the spindle but may be withdrawn to any desired extent so that its outer end is in the most convenient position for being rotated thereby rotating the spindle. The spindle may be provided with a grease hole and grease nipple at a suitable place and with outlet apertures for the grease at the threaded portions and a sleeve may be provided surrounding each of the threaded portions of the spindle so that as the grease escapes the adjacent sleeve causes it to be maintained on the spindle and spread around the threads. The sleeves may be secured to blocks having threaded apertures engaged by the threaded portions of the spindle so that as the blocks are moved together the sleeves approach each other and their contacting may serve to limit the amount of extension of the jack.

In order that the said invention may be clearly understood and readily carried into effect, the same will now be described more fully with reference to the accompanying drawings, in which:—

Figure 1 is a side elevation of a jack constructed in accordance with the invention.

Figures 2 and 3 are a longitudinal central section and a plan view respectively of the spindle.

Figure 4 is a section on line IV—IV of Figure 2, and

Figure 5 illustrates a detail to be referred to.

The spindle A is formed with right and left hand screw-threaded portions $A^1$, $A^2$ respectively, that screw into threaded apertures in blocks $B^1$, $B^2$. Located slidably within the spindle is the rod C having a keyway $C^1$ engaged by a key $C^2$ passing through the spindle and maintained in position by an inner sleeve D and an outer sleeve $D^1$. A lubricant nipple E is screwed through the sleeves D, $D^1$, and spindle A, and enables lubricant to be forced into the keyway $C^1$. The nipple may be screwed down into engagement with the edges of the keyway in the rod to lock it in adjusted position. Outlet apertures $A^3$, $A^4$, are provided in the spindle A at the threaded portions. Secured to the blocks $B^1$, $B^2$, are the sleeves $E^1$, $E^2$, that surround the threaded portions $A^1$, $A^2$, respectively of the spindle A, and serve to maintain the lubricant on the spindle and spread it around the threads. When the jack is being extended or collapsed the sleeves move along the spindle and their contacting together serves to limit the extension of the jack. The left hand end (Figures 2 and 3) of the spindle is turned down to receive a washer F between which and a cap $F^1$ secured to the end of the spindle is a spring washer $F^2$. The right hand end of the spindle is also turned down to receive a washer $F^3$ between which and the left hand end of the sleeves D, $D^1$, is a spring washer $F^4$. When the jack is collapsed to its fullest extent the blocks $B^1$, $B^2$, will move sufficiently apart to move apart the washers F and $F^3$ thereby compressing the spring washers $F^2$, $F^4$, which serve frictionally to maintain the spindle against inadvertent rotation due for example to vibration. The extreme right hand end of the rod C is provided with a conical nose G and pin $G^1$ for engagement by a device for rotating it. The jack comprises two sets of four bars H, the inner ends of the upper bars being pivotally secured to a horizontal anchor plate $H^1$ which is provided with slots of inverted T-shaped cross-section adapted to receive the heads of bolts $H^2$ whereby the jack may be secured to means for fixing the jack to a motor-car axle, spring, or other suitable part. The inner ends of the lower bars are pivotally connected to a base member $H^3$ into which is screwed an upwardly extending threaded stem forming part of a plate $H^4$ for resting upon the ground. The inner ends of corresponding bars in each set are provided with intermeshing teeth for the purpose of ensuring equal and opposite movement of the bars.

If desired one of the sleeves D, $D^1$ may be extended as shown in Figure 5 to provide at its outer end a support or bearing for the rod C, this being particularly useful for a long rod. In the modification illustrated in this figure the outer end of this sleeve D is provided with a split conical nut J which serves the purpose both of a bearing and—when screwed tightly into the sleeve—as a clamp to maintain the rod in its adjusted position.

What I claim as my invention and desire to secure by Letters Patent of the United States is:—

1. A lifting jack comprising a plurality of bars pivoted together to form a toggles or lazy-tongs device, a hollow screw threaded spindle operatively connected with said links, rotation of which spindle causes extension or collapse of the device, and a rod located slidably within the spindle and keyed thereto so that the rod can be withdrawn to any desired extent to bring its outer end into the most convenient position for being rotated thereby rotating the spindle.

2. A lifting jack comprising a plurality of bars pivoted together to form a toggles or lazy-tongs device, a hollow screw threaded spindle operatively connected with said links, rotation of which spindle causes extension or collapse of the device, said spindle having a lubricant inlet hole and outlet apertures for the lubricant located at the threaded portions.

3. A lifting jack comprising a plurality of bars pivoted together to form a toggles or lazy-tongs device, a hollow screw threaded spindle operatively connected with said links, rotation of which spindle causes extension or collapse of the device, said spindle having a lubricant inlet hole and outlet apertures for the lubricant located at the threaded portions, and sleeves surrounding the spindle at the threaded portions and serving to maintain the lubricant on the threads and causing the lubricant to be spread around the threads.

4. A lifting jack comprising a plurality of bars pivoted together to form a toggles or lazy-tongs device, blocks secured to the said bars so that movement towards each other or apart of said blocks causes extension or collapse of the device, said blocks having threaded apertures, a hollow screw threaded spindle threaded into said blocks and having a lubricant inlet hole and outlet apertures for the lubricant at the threaded portions, rotation of the spindle causing movement towards each other or apart of the blocks, and sleeves secured to the blocks and surrounding the spindle at the threaded portions and extending inwardly and serving by contacting with each other to limit the amount of extension of the device.

5. A lifting jack comprising a plurality of bars pivoted together to form a toggles or lazy-tongs device, a hollow screw threaded spindle operatively connected with said links, rotation of which spindle causes extension or collapse of the device, said spindle having a lubricant inlet hole and outlet apertures for the lubricant located at the threaded portions, a rod slidably located within the spindle and keyed thereto, said rod having a passage providing communication between the inlet hole and one of the outlet apertures.

6. A lifting jack comprising a plurality of bars pivoted together to form a toggles or lazy-tongs device, a hollow screw threaded spindle operatively connected with said links, rotation of which spindle causes extension or collapse of the device, and a rod located slidably within the spindle and keyed thereto so that the rod can be withdrawn to any desired extent to bring its outer end into the most convenient position for being rotated thereby rotating the spindle, and means for locking the rod to the spindle.

7. A lifting jack comprising a plurality of bars pivoted together to form a toggles or lazy-tongs device, a hollow screw threaded spindle operatively connected with said links, rotation of which spindle causes extension or collapse of the device, said spindle having a lubricant inlet hole and at least one lubricant outlet aperture for supplying lubricant to the threads.

DONALD WILFRED SESSIONS.